United States Patent
Bownass et al.

(10) Patent No.: US 9,806,803 B2
(45) Date of Patent: Oct. 31, 2017

(54) FREQUENCY OFFSET DETECTION AND CORRECTION IN OPTICAL SPECTRUM MEASUREMENT SYSTEMS

(71) Applicant: Ciena Corporation, Hanover, MD (US)

(72) Inventors: David C. Bownass, Ottawa (CA); Bing Liu, Ottawa (CA); Alex W. Mackay, Ottawa (CA); Choudhury A. Al Sayeed, Gloucester (CA)

(73) Assignee: Ciena Corporation, Hanover, MD (US)

( * ) Notice: Subject to any disclaimer, the term of this patent is extended or adjusted under 35 U.S.C. 154(b) by 6 days.

(21) Appl. No.: 15/080,646

(22) Filed: Mar. 25, 2016

(65) Prior Publication Data

US 2017/0279526 A1  Sep. 28, 2017

(51) Int. Cl.
  *H04B 10/00* (2013.01)
  *H04B 10/079* (2013.01)

(52) U.S. Cl.
  CPC ................. *H04B 10/0795* (2013.01)

(58) Field of Classification Search
  CPC ............ H04B 10/0795; H04B 10/2575; H04B 10/616
  See application file for complete search history.

(56) References Cited

U.S. PATENT DOCUMENTS

| 7,356,256 | B1 | 4/2008 | Strawezynski et al. |
| 8,364,036 | B2 | 1/2013 | Boertjes et al. |
| 8,509,621 | B2 | 8/2013 | Boertjes et al. |
| 8,965,202 | B2 | 2/2015 | Sone et al. |
| 2007/0264010 | A1* | 11/2007 | Bartolini .................. G01J 3/28 398/9 |
| 2013/0044744 | A1* | 2/2013 | Voglewede .......... H04B 1/7077 370/342 |
| 2014/0112660 | A1 | 4/2014 | Al Sayeed et al. |
| 2014/0328583 | A1 | 11/2014 | Al Sayeed et al. |
| 2015/0023674 | A1* | 1/2015 | Salsi ..................... H04B 10/61 398/202 |
| 2015/0341138 | A1* | 11/2015 | Ishihara .......... H04B 10/25133 398/35 |

OTHER PUBLICATIONS

"Spectral grids for WDM applications: DWDM frequency grid", International Telecommunication Union, Feb. 2012, pp. 1-16.

\* cited by examiner

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

A frequency offset detection method in an optical spectrum measurement device, implemented by a controller, includes determining a reference optical spectrum based on expected channels and their associated spectral occupancy without extracting any information from actual received optical spectrum; obtaining a measured optical spectrum from the optical spectrum measurement device; and performing a frequency offset control loop using the reference optical spectrum and the measured optical spectrum to correct frequency offset in the optical spectrum measurement device. The optical spectrum measurement device can be an Optical Channel Monitor and the measured optical spectrum can include optical channels partially overlapping one another in Nyquist or in super-Nyquist spacing.

18 Claims, 12 Drawing Sheets

FREQUENCY OFFSET DETECTION AND CORRECTION IN OPTICAL SPECTRUM MEASUREMENT SYSTEMS

FIELD OF THE DISCLOSURE

The present disclosure generally relates to optical measurement systems and methods such as in fiber optic systems. More particularly, the present disclosure relates to frequency offset detection and correction in optical spectrum measurement systems.

BACKGROUND OF THE DISCLOSURE

In fiber optic systems and other optical systems, optical measurement devices (which can also be referred to as spectrum analyzers) are used for various applications. Exemplary optical measurement devices include Optical Spectrum Analyzers (OSAs), Optical Channel Monitors (OCMs), Optical Performance Monitors (OPMs), etc. Generally, the functionality of optical measurement devices is to measure and assess the quality of various signals at different wavelengths (or frequencies) over a given optical spectrum. In Wavelength Division Multiplexing (WDM) systems, optical measurement devices are used to assess the given channels over the optical spectrum at various transmission points. WDM and Dense WDM optical systems typically use an optical spectrum of about 1530 nm and 1565 nm, which corresponds to the Erbium Doped Fiber Amplifier (EDFA) bandwidth. Conventionally, fixed channels are established on a wavelength grid in the optical spectrum, such as defined in ITU Recommendation G.694.1 "Spectral grids for WDM applications: DWDM frequency grid" (02/12), the contents of which are incorporated by reference herein. Also, new flexible grid ("flex-grid") approaches are also now incorporated in ITU G.694.1.

The flexible grid allows a mixed bit rate or mixed modulation format transmission system to allocate frequency slots with different widths so that they can be optimized for the bandwidth requirements of the particular bit rate and modulation scheme of the individual channels. Such flexible grid deployments contemplate Nyquist or super-Nyquist spacing between channels on the optical spectrum. If each channel occupies BW amount of optical spectrum and the center frequency between adjacent channels is Δf, the super-Nyquist spacing is when Δf is less than BW and Nyquist spacing is when Δf is equal to BW. Practically, Nyquist or super-Nyquist spacing leads to close spacing or even slight overlap between adjacent channels, leading to optical measurement devices being unable to distinguish between adjacent channels.

Optical measurement devices are susceptible to aging effects such as where the frequency measurement on the received optical spectrum shifts or drifts. Frequency drift (power is measured within incorrect frequency bins) in optical measurement devices can be due to random or systematic processes (e.g., device aging, thermal fluctuation, etc.) which impair device performance necessary for reliable power measurement used for monitoring and controlling systems. These problems are exacerbated in flex grid systems since it is possible that signals are so close together that they are indistinguishable from the measurement device's perspective. With frequency drift, the wrong power and spectrum info can be fed back to the several layers of local and sectional optical controllers to act ultimately in the wrong direction.

Conventionally, there are several techniques available for correcting the frequency offsets on the optical measurement devices. Most OCMs use an out-of-band internal laser with known frequency and re-calibrate the device from time to time. However, a single out-of-band laser may not be good enough to correct for the frequency offset tilt that can appear across the spectrum. Additionally, the laser, that is used to re-calibrate the device, also suffers from aging effect and may require re-calibration over time, which then has to be done in an out-of-service fashion.

In flexible grid systems, optical channels can be closely spaced with each other in Nyquist or super-Nyquist spacing. In terms of techniques for detecting frequency offsets for flexible grid spectrum, it is extremely difficult and erroneous to detect peak frequency or center frequency for an individual optical channel or its respective edges from the measured optical spectrum as typically measured in the field using low-resolution OCMs. No known methods are available at this point that can successfully detect frequency offsets for individual flexible grid optical channels over the spectrum with various signal bandwidths and signal power varying conditions.

BRIEF SUMMARY OF THE DISCLOSURE

In an exemplary embodiment, a frequency offset detection method in an optical spectrum measurement device, implemented by a controller includes determining a reference optical spectrum based on expected channels and their associated spectral occupancy without extracting any information from actual received optical spectrum; obtaining a measured optical spectrum from the optical spectrum measurement device; and performing a frequency offset control loop using the reference optical spectrum and the measured optical spectrum to correct frequency offset in the optical spectrum measurement device. The frequency offset control loop can include performing a cross-correlation between the reference optical spectrum and the measured optical spectrum; acquiring a frequency offset based on a difference between a frequency of a center of mass of cross-correlated curve and a center frequency of the reference optical spectrum; and adjusting the optical spectrum measurement device based on the frequency offset. The frequency offset detection method can further include performing a frequency tilt control loop using the measured optical spectrum with the frequency offset corrected and the reference optical spectrum, based on grouping across the optical spectrum to correct frequency offset across or at any point in the optical spectrum. The optical spectrum measurement device can be an Optical Channel Monitor and the measured optical spectrum can include optical channels partially overlapping one another in Nyquist or in super-Nyquist spacing. The optical spectrum measurement device can be an Optical Channel Monitor, and wherein the determining, the obtaining, and the performing can be performed in-service without external equipment. The reference optical spectrum can be determined based on provisioning data which provides the expected channels and their center frequency and hardware capabilities which provide the associated spectral occupancy range of the expected channels. The provisioning data and the hardware capabilities can be obtained through one of a management system, a Software Defined Networking (SDN) controller, and an optical controller.

In another exemplary embodiment, a controller adapted for frequency offset detection in an optical spectrum measurement device includes a processor; and memory storing instructions that, when executed, cause the processor to determine a reference optical spectrum based on expected channels and their associated spectral occupancy without extracting any information from actual received optical spectrum, obtain a measured optical spectrum from the optical spectrum measurement device, and perform a frequency offset control loop using the reference optical spectrum and the measured optical spectrum to correct frequency offset in the optical spectrum measurement device. For the frequency offset control loop, the memory storing instructions that, when executed, can further cause the processor to perform a cross-correlation between the reference optical spectrum and the measured optical spectrum, acquire a frequency offset based on a difference between a frequency of a center of mass of cross-correlated curve and a center frequency of the reference optical spectrum, and adjust the optical spectrum measurement device based on the frequency offset. The memory storing instructions that, when executed, can further cause the processor to perform a frequency tilt control loop using the measured optical spectrum with the frequency offset corrected and the reference optical spectrum, based on grouping across the optical spectrum to correct frequency offset across or at any point in the optical spectrum. The optical spectrum measurement device can be an Optical Channel Monitor, and the measured optical spectrum can include optical channels partially overlapping one another in Nyquist or in super-Nyquist spacing. The optical spectrum measurement device can be an Optical Channel Monitor, and wherein the determining, the obtaining, and the performing can be performed in-service without external equipment. The reference optical spectrum can be determined based on provisioning data which provides the expected channels and their center frequency and hardware capabilities which provide the associated spectral occupancy of the expected channels. The provisioning data and the hardware capabilities can be obtained through one of a management system, a Software Defined Networking (SDN) controller, and an optical controller.

In a further exemplary embodiment, an apparatus adapted for frequency offset detection in an optical spectrum measurement device includes circuitry adapted to determine a reference optical spectrum based on expected channels and their associated spectral occupancy without extracting any information from actual received optical spectrum; circuitry adapted to obtain a measured optical spectrum from the optical spectrum measurement device; and circuitry adapted to perform a frequency offset control loop using the reference optical spectrum and the measured optical spectrum to correct frequency offset in the optical spectrum measurement device. For the frequency offset control loop, the apparatus can further include circuitry adapted to perform a cross-correlation between the reference optical spectrum and the measured optical spectrum, circuitry adapted to acquire a frequency offset based on a difference between a frequency of a center of mass of cross-correlated curve and a center frequency of the reference optical spectrum, and circuitry adapted to adjust the optical spectrum measurement device based on the frequency offset. The apparatus can further include circuitry adapted to perform a frequency tilt control loop using the measured optical spectrum with the frequency offset corrected and the reference optical spectrum, based on grouping across the optical spectrum to correct frequency offset across or at any point in the optical spectrum. The optical spectrum measurement device can be an Optical Channel Monitor and the measured optical spectrum can include optical channels partially overlapping one another in Nyquist or in super-Nyquist spacing. The optical spectrum measurement device can be an Optical Channel Monitor, and wherein the determining, the obtaining, and the performing can be performed in-service without external equipment. The reference optical spectrum can be determined based on provisioning data which provides the expected channels and their center frequency and hardware capabilities which provide the associated spectral occupancy of the expected channels; and wherein the provisioning data and the hardware capabilities can be obtained through one of a management system, a Software Defined Networking (SDN) controller, and an optical controller.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
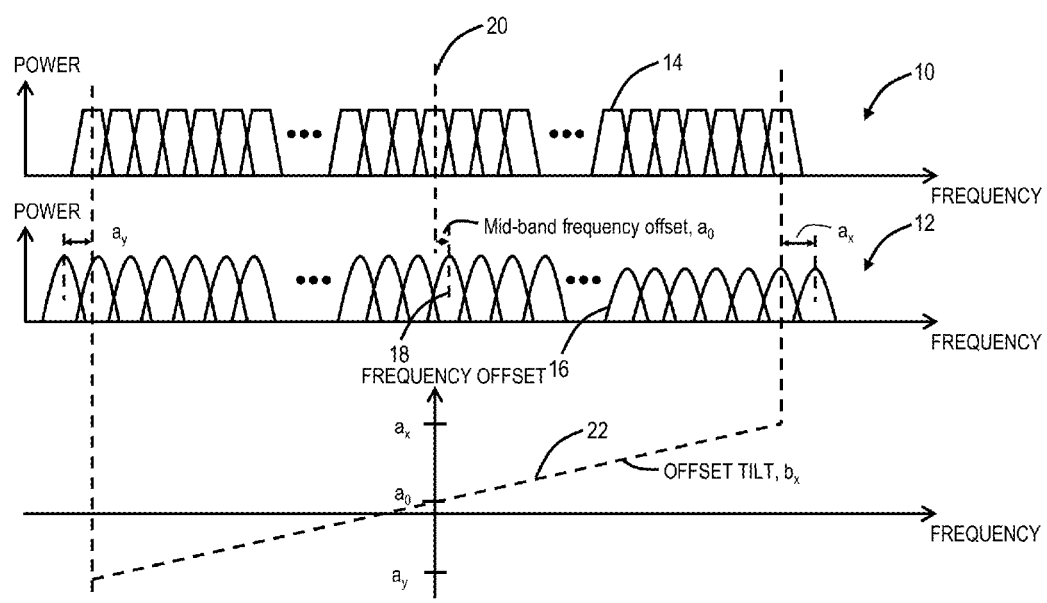
FIG. 1 is a graph of frequency offset and tilt between a reference optical spectrum, R(f), and a measured optical spectrum, M(f)

Again, in various exemplary embodiments, the present disclosure relates to frequency offset detection and correction in optical spectrum measurement systems. The present disclosure describes a flexible optical drift controller and associated method which can be applied to any optical measurement device, e.g., OCM, OSA, OPM, etc., to detect, measure, and correct any frequency drift. The optical drift controller contemplates operation on a processor or embedded system which the associated computational resources to perform the steps, and the optical drift controller is part of or communicatively coupled to the optical measurement device. The optical drift controller takes inputs obtained from the optical measurement device, i.e., spectrum measurements, along with a set known values based on provisioning information. The known values are based on provisioning information, i.e., what the optical measurement device expects to see. Note, the optical measurement device does not know channel topology (i.e., what the device expects to see); rather, this information is known at higher layers, but available to the optical drift controller.

The optical drift controller detects frequency offsets for a plurality of analog optical channels, where the frequency offset from one optical channel may be different from the frequency offsets of other copropagating optical channels, using a cross-correlation of the measured optical spectrum (measured input) with a reference optical spectrum (known values), wherein the reference optical spectrum is formed only with expected optical channels' spectral occupancy. The spectral occupancy of an optical channel usually refers to the bandwidth (BW) of the optical signal carrying the optical channel payload (OCh-P). The optical drift controller's key strength relies on its ability in detecting frequency drifts of individual optical channels even if the channels are partially overlapping with each other in frequency spectrum in Nyquist spacing (center frequency to center frequency distance of two neighboring or adjacent optical channels, known as channel spacing are equal to their baud-rate) or in super-Nyquist spacing (channel spacing<baud-rate).

To retrieve the frequency drifts or offsets for individual optical channels, the optical drift controller does not rely on any digital signaling info such Bit Error Rate (BER), Loss of Clock (LOC) or clock cycles, nor does it depends on reference optical channels' power information or their relative power deltas. The measured optical spectrum can be obtained at any location of an optical section using the optical measurement device, and the optical drift controller can be implemented to correct the frequency drifts of the measured optical channels. The known values of the reference optical spectrum can be transmitted from an optical section head, a management system, a Software Defined Networking (SDN) controller, etc. such as via an Optical Supervisory Channel (OSC) or Data Communications Network (DCN).

The typical optical measurement devices drift in frequency over time due to the aging of the optical elements and require frequent offline, out-of-service calibration with externally known signals from time to time. Advantageously, the optical drift controller provides remote, in-service frequency calibration of the optical measurement device in a non-service affecting fashion (i.e., in-service) without any need for any external lasers or external out-of-band of optical signals. Again, the optical drift controller is capable of detecting frequency drifts of individual optical channels even if the channels are partially overlapping with each other in the frequency spectrum in Nyquist spacing or in super-Nyquist spacing. The optical drift controller uses a reference optical spectrum formed only with expected optical channels' spectral occupancy without extracting any digital signal info from the received/measured optical spectrum. Finally, the optical drift controller does not rely on optical power info or relative power differences of the optical channels, where other known techniques may have to apply special adjustments to handle Nyquist or super-Nyquist spaced spectrums.

Frequency Offset and Tilt Definition

Referring to FIG. 1, in an exemplary embodiment, a graph illustrates frequency offset and tilt between a reference optical spectrum 10, R(f), and a measured optical spectrum 12, M(f). The reference optical spectrum 10 are known values based on provisioning, i.e., what should the optical spectrum look like based on what channels are actually provisioned and equipped in the system. The reference optical spectrum 10 is based on provisioning data received by the optical drift controller, e.g., from a management system, SDN controller, optical controller, etc. The reference optical spectrum 10 includes a plurality of channels 14 based on known optical signals spectral occupancy information (such as signal bandwidth, center frequency, etc.). That is, the reference optical spectrum 10 is an ideal perfect spectrum based on what should be seen given a set of provisioning data which each channel 14 occupying exactly the correct amount of signal bandwidth at the ideal center frequency. Construction of the reference optical spectrum 10 is done through provisioning data and associated specifications. For example, X channels 14 are provisioned and each channel 14 has associated signal bandwidth and center frequency. With the provisioning data and associated specifications, the ref reference optical spectrum 10 is mathematically constructed as a model. In the example of FIG. 1, each channel 14 in the reference optical spectrum 10 is shown with the same amount of signal bandwidth. Of course, in a flex grid, the signal bandwidth may be variable. Also, each channel 14 in the reference optical spectrum 10 is shown slightly overlapping adjacent channels 14, thereby illustrating super-Nyquist spacing.

An example of the measured optical spectrum 12 is shown below the reference optical spectrum 10. The measured optical spectrum 12 is based on measurement data from an optical measurement device. As can be seen in FIG. 1, actual individual optical channels 16 can drift in frequency, and the actual spectral shape, measured power values, and signal to signal relative power deltas can be significantly different from the spectral shapes and powers assumed at the reference optical spectrum 10. That is, the measured optical spectrum 12 is actual measurement data in a physical system whereas the reference optical spectrum 10 is ideal without any aging, temperature, or other effects degrading performance.

The optical drift controller primarily uses two key parameters to identify the frequency offset for individual optical channels 16; one is a mid-band frequency offset, as denoted by $a_0(t)$, that defines the frequency shift of a center frequency 18 of the measured optical spectrum 12 in mid-band compared to a center frequency 20 of the referenced optical spectrum 10. The second parameter is offset tilt 22, denoted by $b_x(t)$, that defines the slope of frequency shifts with respect to the overall reference spectrum. There are also end-band frequency offsets, denoted by $a_y(t)$ and $a_x(t)$.

In various exemplary embodiments, the optical drift controller utilizes the reference optical spectrum 10 to correct an optical measurement device performing a measurement of the measured optical spectrum 12 using cross-correlation between the reference optical spectrum 10 and the measured optical spectrum 12. Thus, the optical drift controller is able to detect and correct for frequency tilt and frequency drift without external equipment such as a laser; instead, the optical drift controller relies on the expected reference optical spectrum 10 to perform the correction.

In mathematical terms, the cross-correlation ϕ(f) of two continuous functions x(f) and y(f) can be expressed as:

$$\phi(f) = \int_{-\infty}^{\infty} x(\tau-f) y(\tau) d\tau$$

The shift (τ) can be in space-domain, time-domain or frequency-domain. The cross correlation is a well-established mathematical tool for analyzing the statistical relation between two random signals, for determining the relative delays, for pattern recognition in image processing, etc.

Optical Measurement Device

Figure 2:
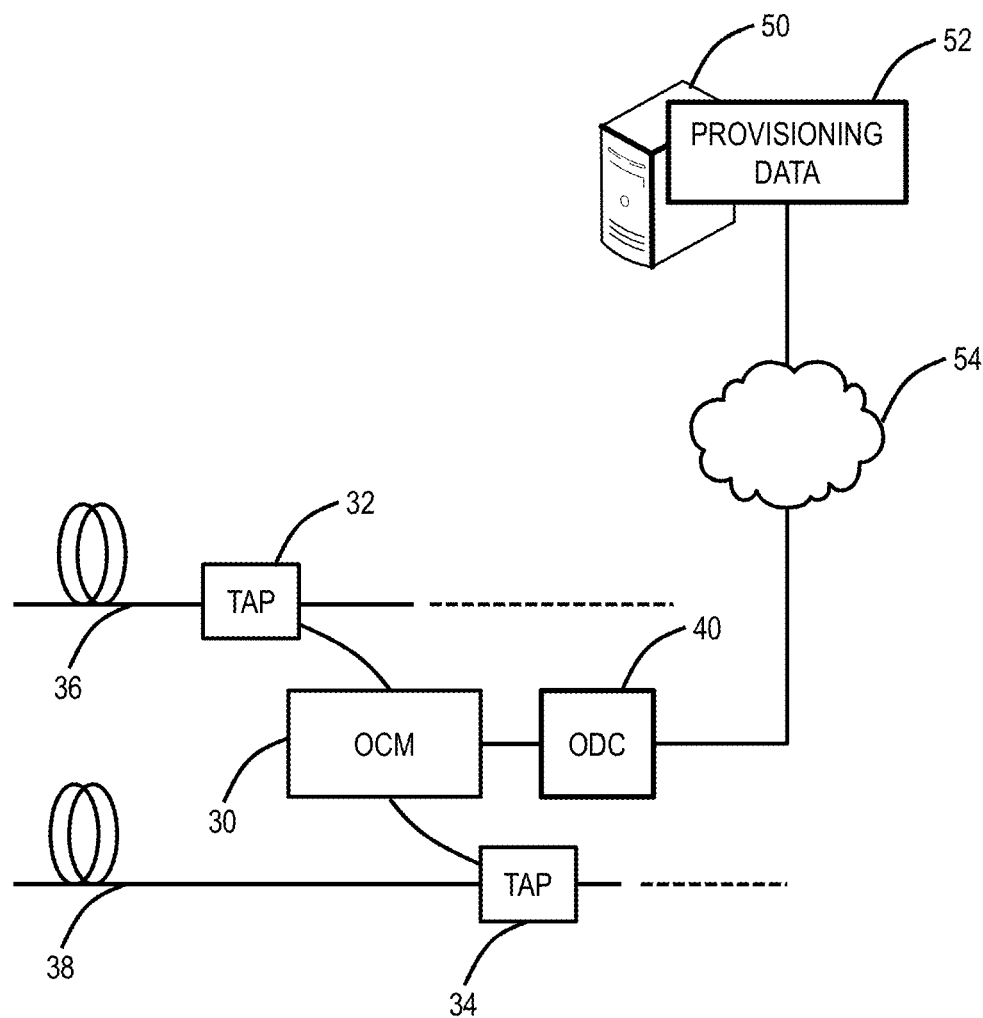
FIG. 2 is a block diagram of an Optical Channel Monitor (OCM) with an Optical Drift Controller (ODC) for detecting and correcting frequency offset and tilt.

Referring to FIG. 2, in an exemplary embodiment, a block diagram illustrates an Optical Channel Monitor (OCM) 30 with an Optical Drift Controller (ODC) 40 for detecting and correcting frequency offset and tilt. Again, the OCM 30 is an exemplary optical measurement device that can use the optical drift controller and process described herein. The OCM 30 is an optical device that is adapted to measure individual channels in an optical communication system, i.e., to provide the measured optical spectrum 12. In an exemplary implementation, the OCM 30 can be located at an optical amplifier or at a degree in a Reconfigurable Optical Add/Drop Multiplexer (ROADM) receiving inputs from power taps 32, 34. The power taps 32, 34 can split a small portion of optical power to the OCM 30 for measurement thereof. The power tap 32 may be at an input fiber 36 to the optical amplifier or degree and the power tap 34 may be at an output fiber 38 from the optical amplifier or degree. Thus, the OCM 30 may monitor input and output optical spectrum. Internally, the OCM 30 can include switching components to switch between the fibers 36, 38 (and other fibers) as the OCM 30 may be shared between different fibers 36, 38. Various other components associated with the optical amplifier or degree are omitted for illustration purposes. Also, the optical drift controller and process can be used in other types of optical measurement devices, i.e., the OCM 30 is an exemplary optical measurement device in an exemplary application, namely fiber optic communication systems. Note, while the disclosure describes optical spectrum measurement devices, the techniques described herein are also contemplated with other electromagnetic spectrums, such as Radio Frequency (RF), etc.

The ODC 40 includes a processor or other circuitry adapted to perform various steps and functions described herein. The ODC 40 is communicatively coupled to the OCM 30 for receiving the measured optical spectrum 12. The ODC 40 is also communicatively coupled to a server 50 which includes provisioning data 52 such as through a DCN 54 for receiving the reference optical spectrum 10. The DCN 54 can use an OSC, Ethernet, IP, Optical Transport Network (OTN) overhead, or the like. The server 50 can be a management system (e.g., Network Management System (NMS), Element Management System (EMS), etc.), an optical controller, an SDN controller, an SDN application, or the like. That is, the server 50 can be any system containing the provisioning data 52. Again, the reference optical spectrum 10 is determined from the provisioning data 52 for each of the fibers 36, 38.

Optical Drift Controller Process

Figure 3:
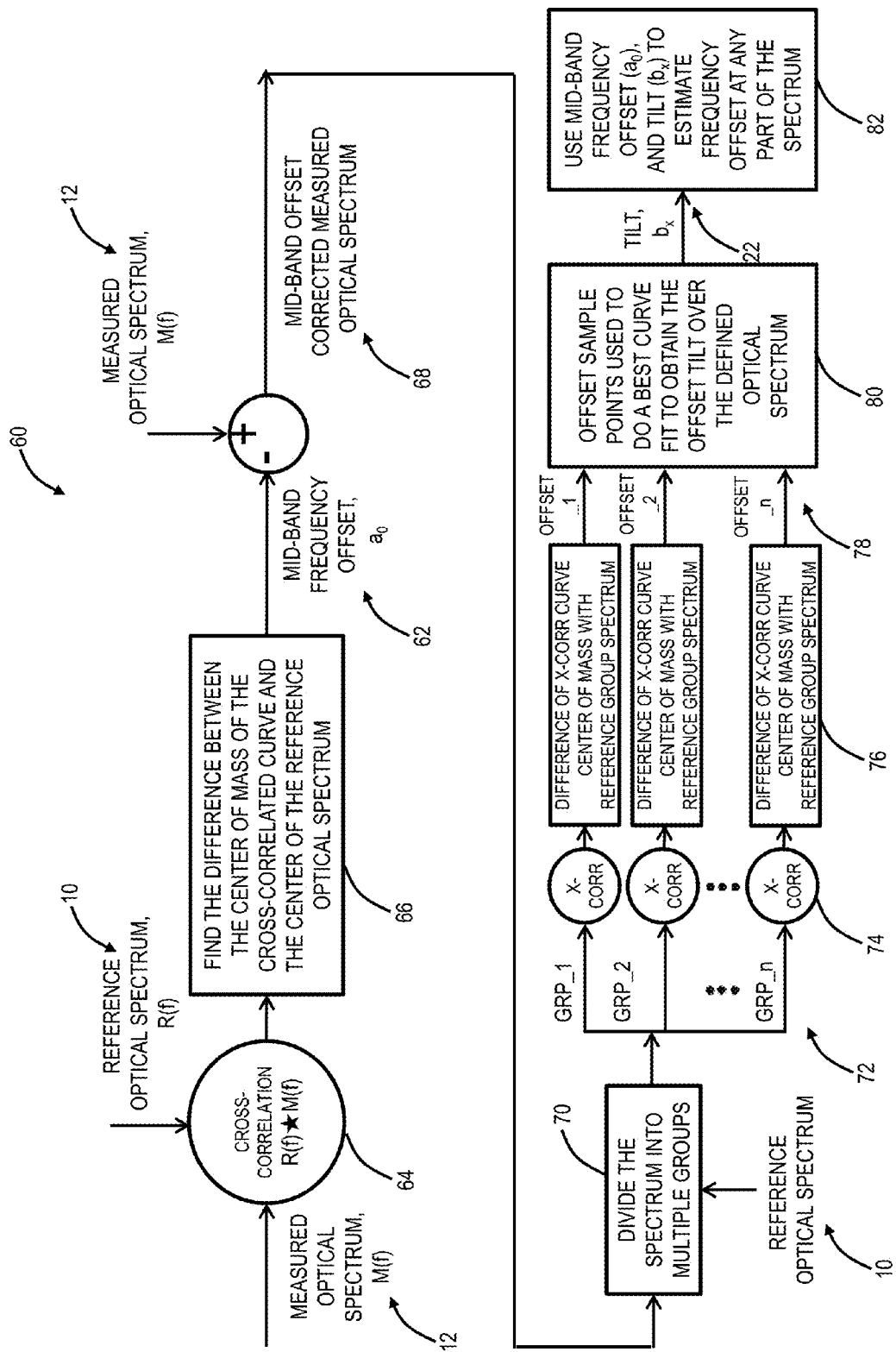
FIG. 3 is a flow diagram of an optical drift controller control loop for detecting frequency offset and tilt in the measured optical spectrum given the reference optical spectrum.

Referring to FIG. 3, in an exemplary embodiment, a flow diagram illustrates an optical drift controller control loop 60 for detecting frequency offset and tilt in the measured optical spectrum 12 given the reference optical spectrum 10. The optical drift controller control loop 60 contemplates operation by the ODC 40. The optical drift controller control loop 60 generally includes two stages. In a first stage, the optical drift controller control loop 60 detects a mid-band frequency offset 62, $a_0(t)$, by cross-correlating the reference optical spectrum 10 with the measured optical spectrum 12 (step 64). Subsequent to the cross-correlating, the optical drift controller control loop 60 includes finding the frequency shifts at the center of mass of the cross-correlated curve compared to the reference optical spectrum (step 66). The calculated mid-band frequency offset 62 is then applied to the measured optical spectrum 12 to obtain a mid-band offset corrected measured optical spectrum 68 that is then used for second stage calculations.

In the second stage, the optical drift controller control loop 60 divides the both the optical spectrum into multiple groups (step 70), where for each group 72 (GRP_1, GRP_2, . . . , GRP_n), a cross-correlation 74 is performed between the reference optical spectrum 74 and the mid-band offset corrected optical spectrum 68 for the specified bandwidth of each group 72, and then the frequency shift is calculated for the center of mass of their corresponding cross-correlated curve (step 76). Each of these groups' calculated offset points 78 is then used to do a best-fit curve (e.g. linear or polynomial) to obtain the offset tilt 22, $b_x(t)$ (step 80). The calculated mid-band frequency offset 62 ($a_0(t)$) and the offset tilt 22 ($b_x(t)$) are then used to estimate the frequency offset at the center frequency of individual optical channels (step 82).

Figure 4:
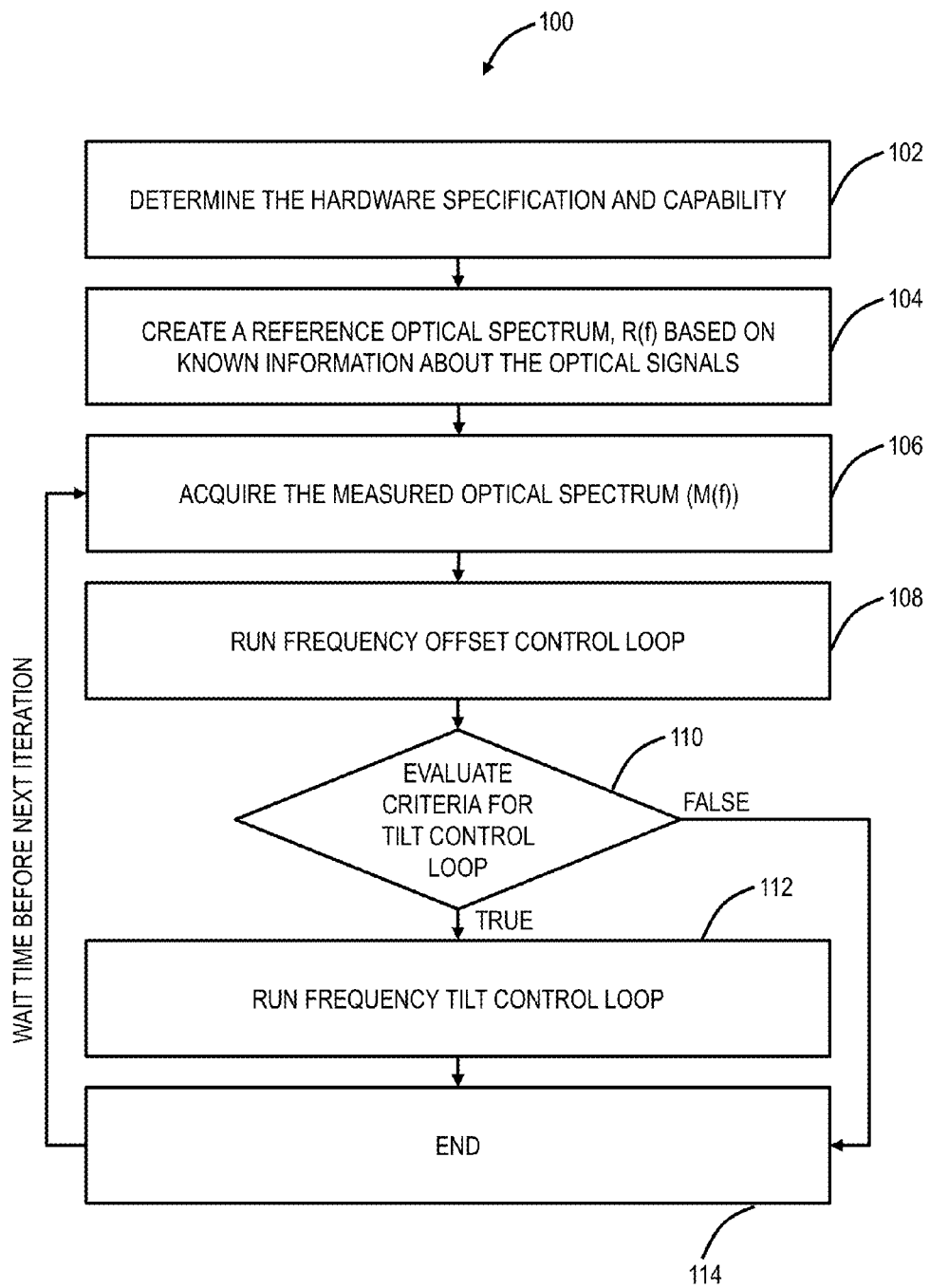
FIG. 4 is a flowchart of an optical drift controller process, utilizing the optical drift controller control loop of FIG. 3.

Referring to FIG. 4, in an exemplary embodiment, a flowchart illustrates an optical drift controller process 100, utilizing the optical drift controller control loop 60. The optical drift controller process 100 can be implemented by the ODC 40, in communication with the server 50 and the OCM 30. The optical drift controller process 100 includes determining the hardware specification and capability (step 102), such as from the provisioning data 52. The optical drift controller process 100 includes creating the reference optical spectrum 10, R(t), based on known information about the optical signals (step 104), acquiring the measured optical spectrum 12, M(t) (step 106), running a frequency offset control loop (i.e., the first stage of the optical drift controller control loop 60) (step 108), evaluating criteria for the tilt control loop (step 110), if the tilt control loop is needed, running the frequency tilt control loop (i.e., the second stage of the optical drift controller control loop 60) (step 112), and if the tilt control loop is not needed or after step 112, ending (step 114). The optical drift controller process 100 can periodically be rerun as well.

Figure 5:
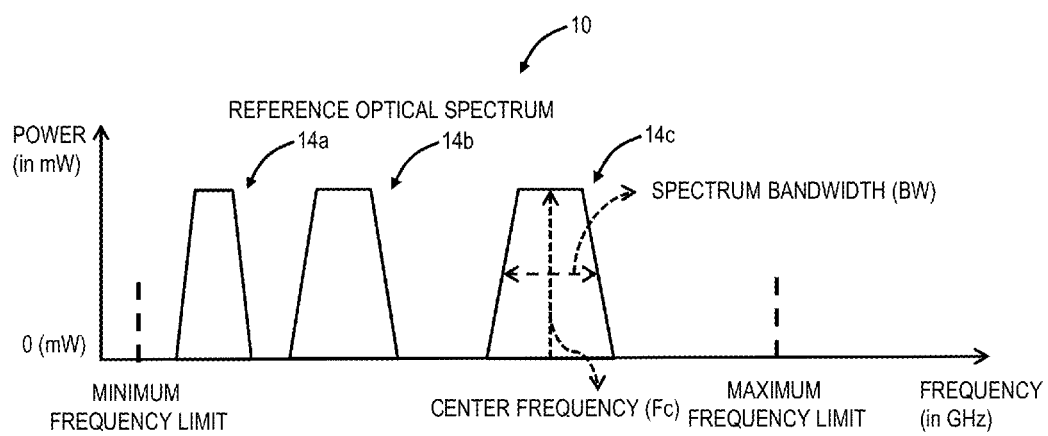
FIG. 5 is a graph of creating the reference optical spectrum in the optical drift controller process of FIG. 4.

Referring to FIG. 5, in an exemplary embodiment, a graph illustrates creating the reference optical spectrum 10 in the optical drift controller process 100, i.e., step 104. Again, the reference optical spectrum 10 is created based on known information about the optical signals, e.g., from the provisioning data 52 and associated hardware specifications and capabilities. Specifically, the provisioning data 52 determines which channels are present at a center frequency ($F_c$) whereas the associated hardware specifications from the provisioning data determine the spectral bandwidth (BW). Once these two parameters are known—$F_c$ and BW, across the optical spectrum, the reference optical spectrum is created by fitting these data points into a predefined idealized spectral shape. The spectral shape can be a trapezoid, rectangle, a parabola, or the like. In an exemplary embodiment, such as illustrated in FIG. 5, the spectral shape is a trapezoid. For illustration purposes, FIG. 5 includes three channels 14a, 14b, 14c with their idealized spectral shape as a trapezoid.

Figure 6:
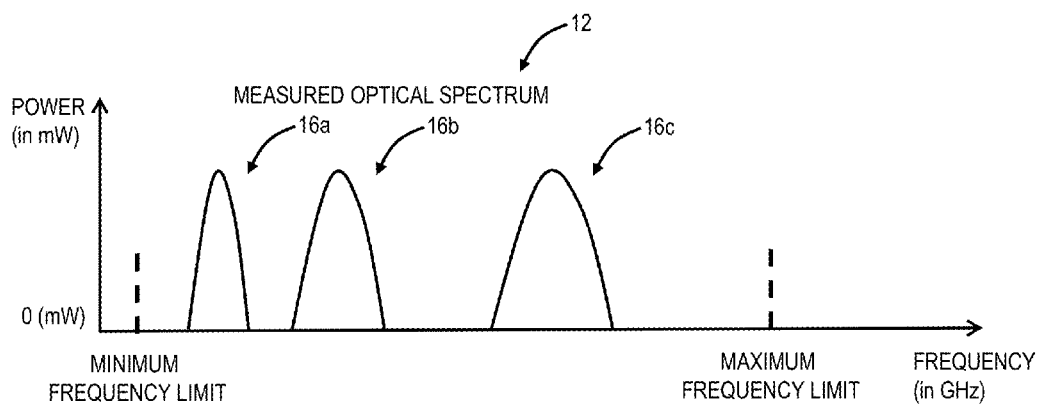
FIG. 6 is a graph of acquisition of the measured optical spectrum in the optical drift controller process of FIG. 4.

Referring to FIG. 6, in an exemplary embodiment, a graph illustrates acquisition of the measured optical spectrum 12 in the optical drift controller process 100, i.e., step 106. Again, the measured optical spectrum 12 is acquired based on measurement, such as by the OCM 30, an OSA, etc. The measured optical spectrum 12 includes three channels 16a, 16b, 16c with their actual spectral shape and the three channels 16a, 16b, 16c should correspond to the three channels 14a, 14b, 14c in the reference optical spectrum 10. For purposes of the optical drift controller control loop 60 and the optical drift controller process 100, the measured optical spectrum 12 data should include frequency range, frequency resolution, and channel powers in the frequency range of interest.

Figure 7:
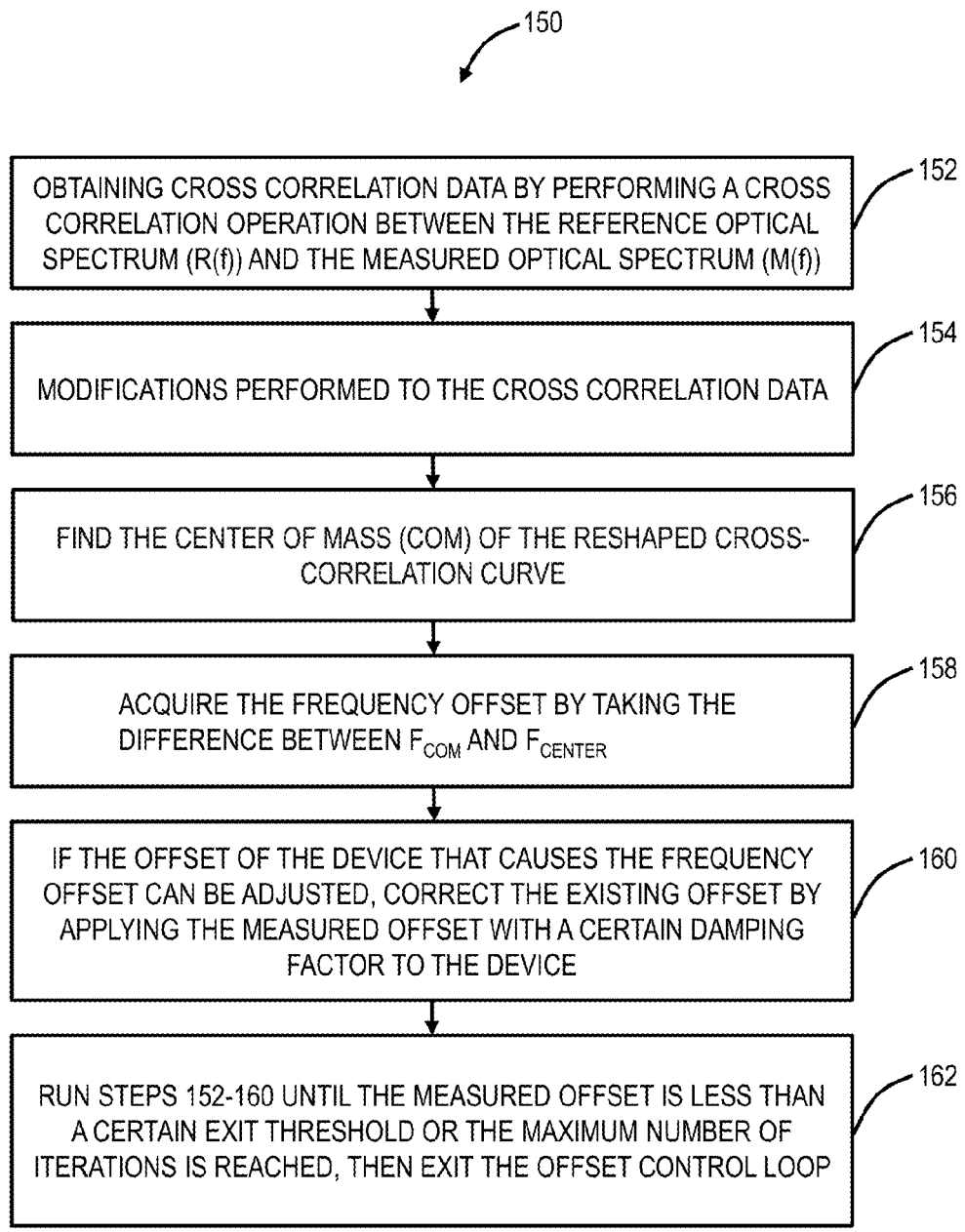
FIG. 7 is a graph of a cross-correlation curve of cross-correlation data between the reference optical spectrum R(f) and the measured optical spectrum M(f) before applying the data modification to collapse the curve into a Dirac-like distribution.

Referring to FIG. 7, in an exemplary embodiment, a flowchart illustrates a frequency offset control loop 150, which is the first stage of the optical drift controller control loop 60. After the reference optical spectrum 10 is created, and the measured optical spectrum 12 is acquired, the optical drift controller process 100 includes running the frequency offset control loop 150, i.e., step 108. The frequency offset control loop is the first stage of the optical drift controller control loop 60 and includes obtaining cross-correlation data by performing a cross correlation operation between the reference optical spectrum 10 (R(f)) and the measured optical spectrum 12 (M(f)) (step 152).

After the cross-correlation data is obtained, modifications are performed (step 154). The cross-correlation data is normalized by dividing all data by a maximum value within the set. The cross-correlation data can also be collapsed into a Dirac-like distribution by raising the cross-correlated data to a large power (e.g., to the power of 100) to improve center-of-mass evaluation of drift (hence the previous normalization step to reduce the magnitude of numbers stored).

Next, the frequency offset control loop 150 includes finding the center of mass (COM) of the reshaped cross-correlation curve (step 156). The location on the frequency axis where the COM occurs is denoted as Frequency of the COM ($F_{com}$) and an equation used for finding the COM ($F_{com}$=frequency @ the COM) is as follows:

$$Fcom = \frac{\sum_{i}^{N} \text{Magnitude}(i) * \text{Frequency index}(i)}{\sum_{i}^{N} \text{Magnitude}(i)}$$

where i=1 and N=number of sample point*2−1

Figure 8:
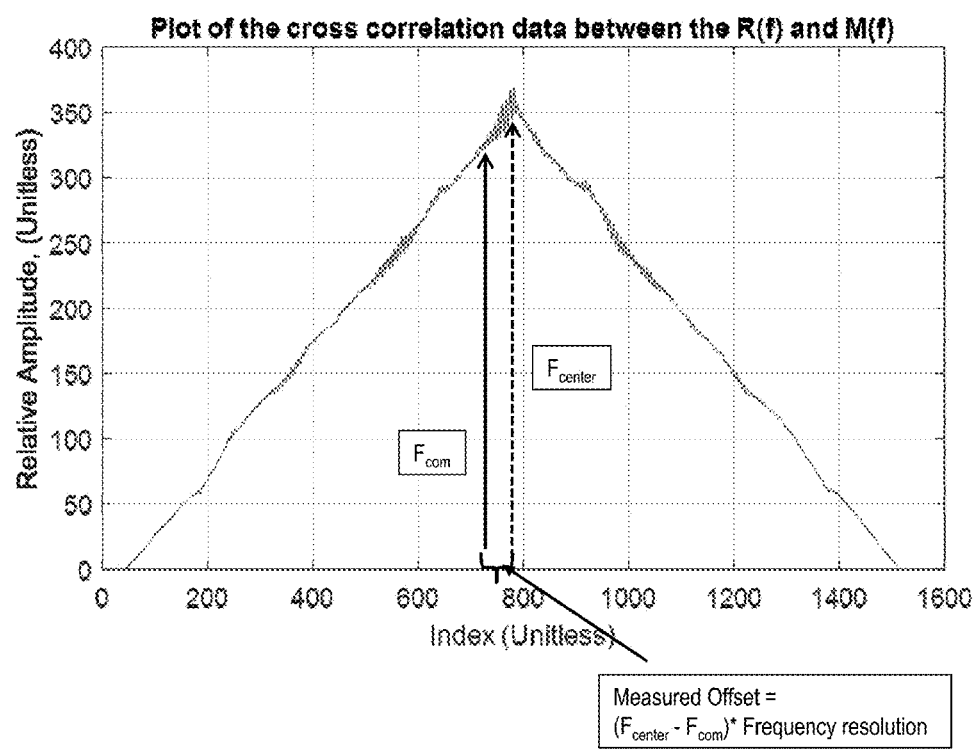
FIG. 8 is a flowchart of a frequency offset control loop, which is the first stage of the optical drift controller control loop of FIG. 3.

Next, the frequency offset control loop 150 includes acquiring the frequency offset by taking the difference between $F_{com}$ and $F_{center}$ (step 158). $F_{center}$ relies on the number of sampled data in the measurements. The Measured Offset=($F_{center}$−$F_{com}$)*(Frequency resolution). Referring to FIG. 8, in an exemplary embodiment, a graph illustrates a cross-correlation curve of cross-correlation data between the reference optical spectrum 10 R(f) and the measured optical spectrum 12 M(f) before applying the data modification to collapse the curve into a Dirac-like distribution.

Referring back to FIG. 7, next, if the offset of the device that causes the frequency offset can be adjusted, the existing offset is corrected by applying the measured offset with a certain damping factor to the device (step 160). Finally, steps 152-160 are repeated until the measured offset is less than a certain exit threshold (e.g., 0.5 GHz) or the maximum number of iterations is reached (e.g., 10 runs), then exit the frequency offset control loop 150.

Figure 9:
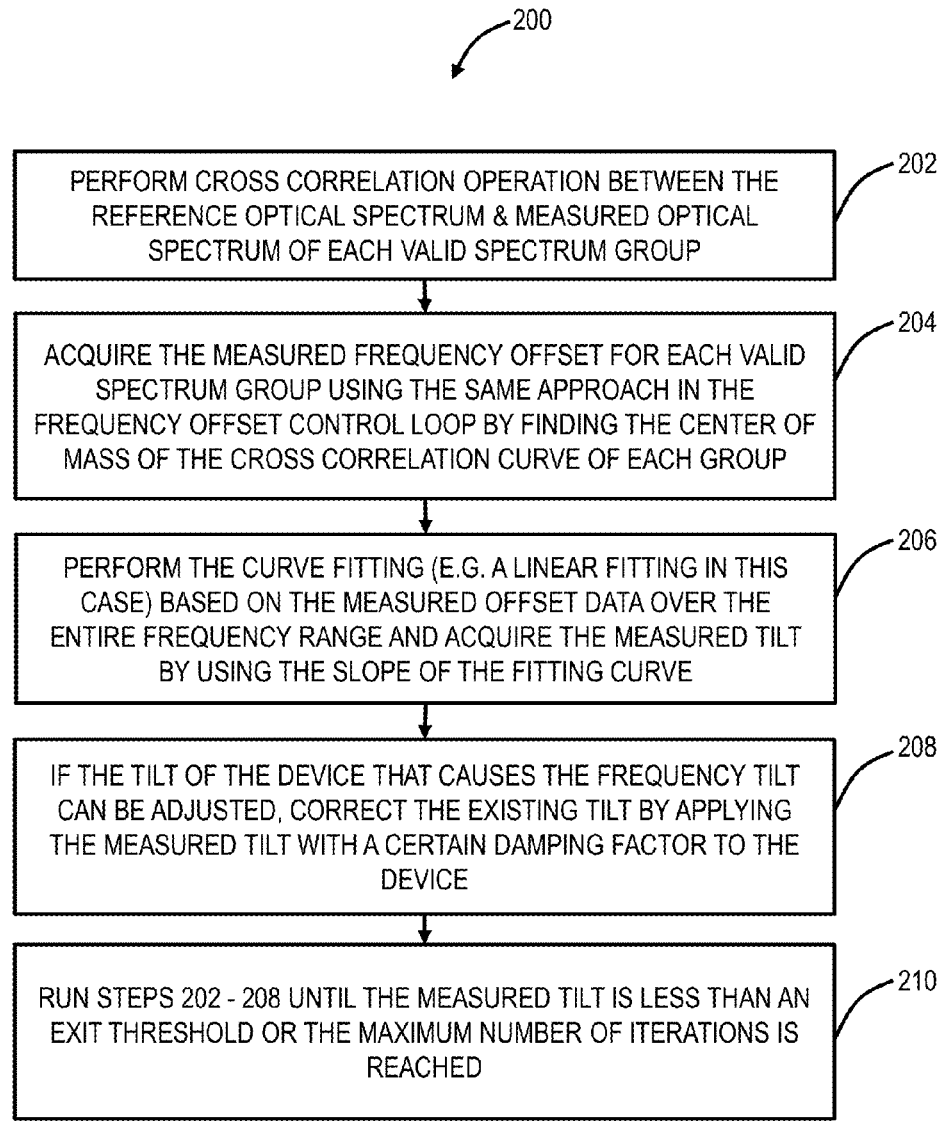
FIG. 9 is a flowchart of a frequency tilt control loop, which is the second stage of the optical drift controller control loop of FIG. 3.

Referring to FIG. 9, in an exemplary embodiment, a flowchart illustrates a frequency tilt control loop 200, which is the second stage of the optical drift controller control loop 60. FIG. 7 and the frequency offset control loop 150 provide additional detail for step 108 in the optical drift controller process 100. In FIG. 4, after step 108, the frequency offset control loop 150 has run and converged. Next, criteria are evaluated for the frequency tilt control loop 200. The current frequency occupation within the operating frequency range includes dividing the reference optical spectrum 10 into multiple spectrum groups, as well as for the measured optical spectrum 12 and calculating the frequency occupation ratio of each spectrum group. If the channel fill ratio is greater than a predefined threshold, a corresponding spectrum group is declared to be a valid group for the tilt measurement.

The following rules are implemented to ensure that there are enough spectrum allocations spreading out across the entire operating frequency range. There are at least two valid spectrum groups among all the divided groups. It guarantees that at least two valid data points can be used to perform the curving fitting when calculating the frequency tilt. The spacing between the leftmost valid group and the right most valid group must be greater than half of the total number of the divided groups. If above criteria are met, the frequency occupation within the operating frequency range for running the frequency tilt control loop 200 next is considered to be fulfilled.

Figure 10:
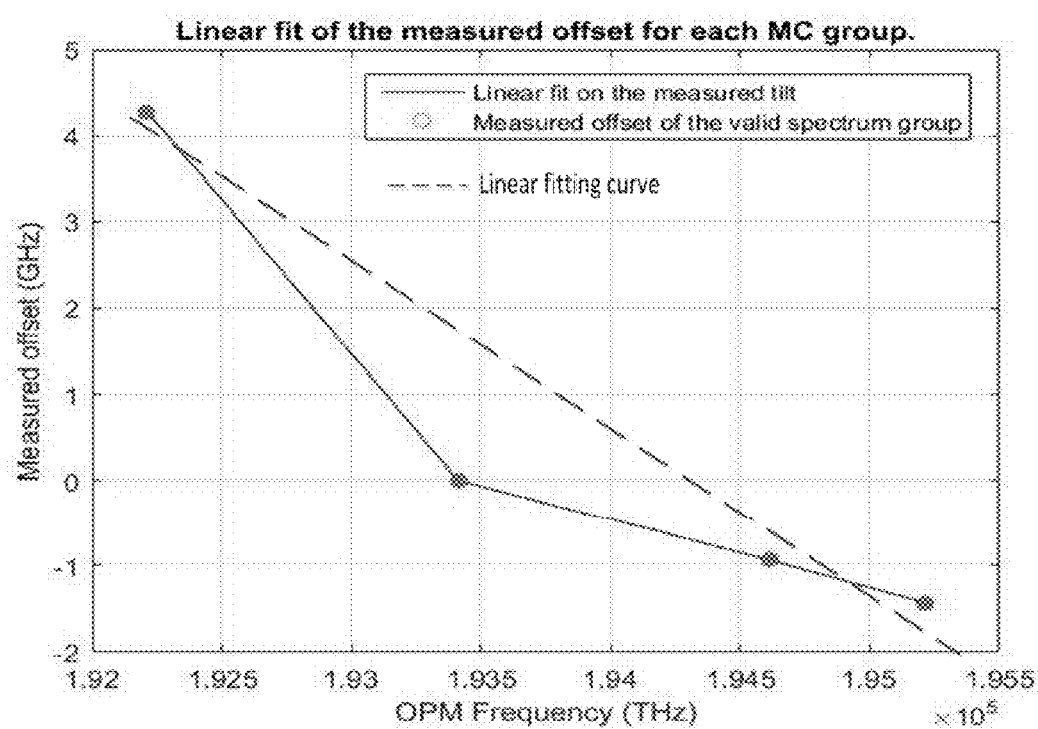
FIG. 10 is a graph of linear fit of the measured offset for each group.

The frequency tilt control loop 200 includes performing a cross correlation operation between the reference optical spectrum 10 and the measured optical spectrum 12 of each valid spectrum group (step 202), acquiring the measured frequency offset 78 for each valid spectrum group using the same approach in the frequency offset control loop 150 by finding the center of mass of the cross-correlation curve of each group (step 204), performing the curve fitting (e.g., a linear fitting in this case) based on the measured frequency offset 78 over the entire frequency range and acquire the measured offset tilt 22 by using the slope of the fitting curve (step 206), if the tilt of the device that causes the frequency tilt can be adjusted, correcting the existing tilt by applying the measured offset tilt 22 with a certain damping factor to the device (step 208), and repeating steps 202-210 until the measured offset tilt 22 is less than an exit threshold or a maximum number of iterations is reached (step 210). Referring to FIG. 10, in an exemplary embodiment, a graph illustrates linear fit of the measured offset for each group.

Exemplary Operation

Figure 11:
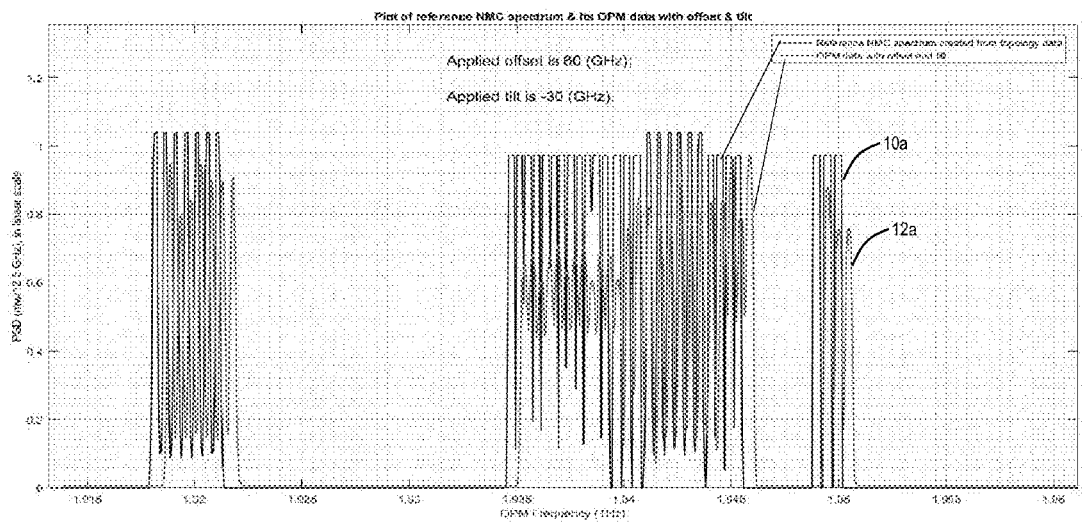
FIG. 11 is a graph of an exemplary reference optical spectrum overlaid on an exemplary measured optical spectrum.
Figure 12:
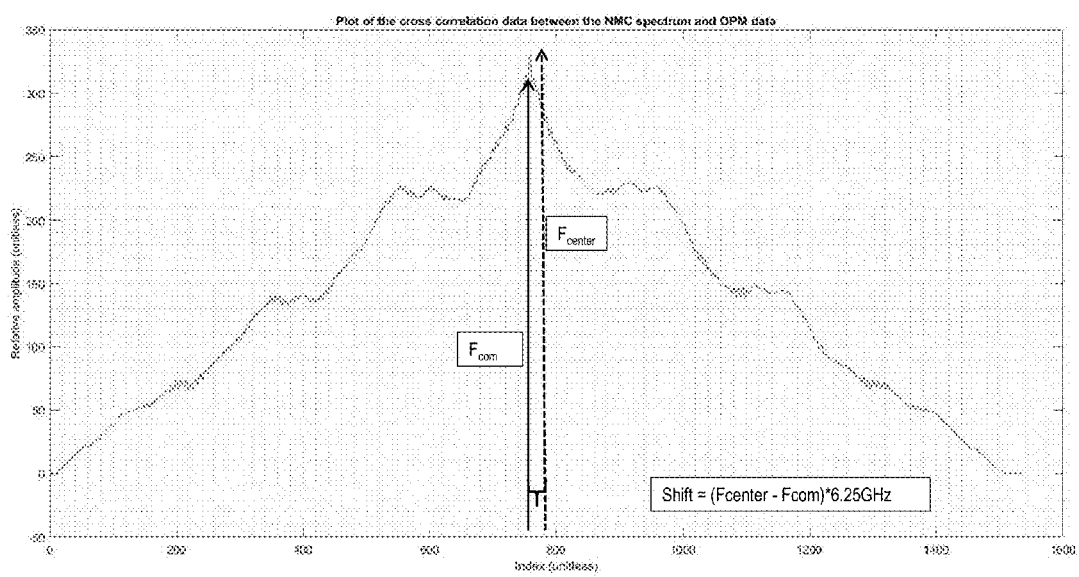
FIG. 12 is a graph of a cross-correlation curve of cross-correlation data between the reference optical spectrum and the measured optical spectrum from FIG. 11 before applying the data modification to collapse the curve into a Dirac-like distribution.

Referring to FIG. 11, in an exemplary embodiment, a graph illustrates an exemplary reference optical spectrum 10a overlaid on an exemplary measured optical spectrum 12a. For illustration, the applied offset is 60 GHz, and the applied tilt is −30 GHz. The reference optical spectrum 10a is determined based on the known data and uses a trapezoid shape. The measured optical spectrum 12a is based on channel powers of 771 frequency grids. The optical drift controller process 100 is implemented, including the frequency offset control loop 150. Referring to FIG. 12, in an exemplary embodiment, a graph illustrates a cross-correlation curve of cross-correlation data between the reference optical spectrum 10a and the measured optical spectrum 12a before applying the data modification to collapse the curve into a Dirac-like distribution.

Next, it is determined if criteria are met so that the frequency tilt control loop 200 can be run. The channel fill condition across the optical spectrum (C-band) in this example is met. The reference optical spectrum 10a is divided into 8 spectrum groups [1-8], as well as for the measured optical spectrum 12a. In this example, each spectrum group occupies 600 GHz bandwidth of the C-band of 4800 GHz. The number 8 is selected for ease of use and provides adequate data points for the tilt measurement. The channel fill ratio of each spectrum group is calculated. If the channel fill ratio is greater than a predefined threshold, the corresponding spectrum group is declared to be a valid group for the tilt measurement.

For example, the following rules are implemented to ensure that there are enough channels spread out across the whole C-band. First, there are at least two valid spectrum groups among the 8 groups. It guarantees that there are at least two valid data points to perform the linear fitting when calculating the tilt. The spacing between the leftmost valid group and the right most valid group must be greater than 4. The minimal spacing of 4 groups means that the optical spectrum experiences, at least, ~60% of the entire tilt (assuming a linear tilt shape on the OCM across the C-band). If above rules are met, the channel fill condition across the C-band for running the tilt control loop next is considered to be fulfilled.

Figure 13:
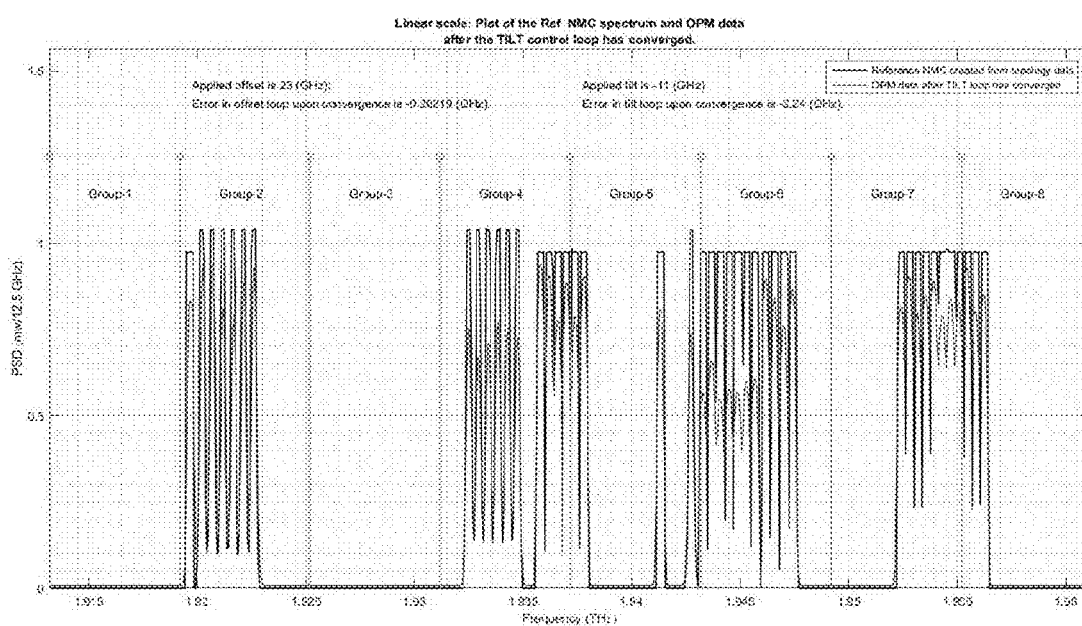
FIG. 13 is a graph of eight exemplary groups for the reference optical spectrum overlaid on an exemplary measured optical spectrum from FIG. 11.

Referring to FIG. 13, in an exemplary embodiment, a graph illustrates eight exemplary groups for the reference optical spectrum 10a overlaid on an exemplary measured optical spectrum 12a. Here, Valid Groups are 2, 4, 6, 7 (due to channel fill ratio≥the threshold) and Invalid groups are 5, 8 (due to channel fill ratio<the threshold). Thus, there are four valid groups and spacing Group 7 (right most)—Group 2 (left most)=5.

Next, the graph in FIG. 10 illustrates linear fit of the measured offset for each of the Valid Groups 2, 4, 6, 7. With the linear fitting curve in FIG. 10, the measured offset tilt=6.3 GHz.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A frequency offset detection method in an optical spectrum measurement device, implemented by a controller, the frequency offset detection method comprising:
   determining a reference optical spectrum based on expected channels and their associated spectral occupancy without extracting any information from actual received optical spectrum;
   obtaining a measured optical spectrum from the optical spectrum measurement device; and
   performing a frequency offset control loop using the reference optical spectrum and the measured optical spectrum to correct frequency offset in the optical spectrum measurement device;
   wherein the reference optical spectrum is determined based on provisioning data which provides the expected channels and their center frequency and hardware capabilities which provide the associated spectral occupancy range of the expected channels.

2. The frequency offset detection method of claim 1, wherein the frequency offset control loop comprises:
   performing a cross-correlation between the reference optical spectrum and the measured optical spectrum;
   acquiring a frequency offset based on a difference between a frequency of a center of mass of cross-correlated curve and a center frequency of the reference optical spectrum; and
   adjusting the optical spectrum measurement device based on the frequency offset.

3. The frequency offset detection method of claim 1, further comprising:
   performing a frequency tilt control loop using the measured optical spectrum with the frequency offset corrected and the reference optical spectrum, based on grouping across the optical spectrum to correct frequency offset across or at any point in the optical spectrum.

4. The frequency offset detection method of claim 1, wherein the optical spectrum measurement device is an Optical Channel Monitor and the measured optical spectrum comprises optical channels partially overlapping one another in Nyquist or in super-Nyquist spacing.

5. The frequency offset detection method of claim 1, wherein the optical spectrum measurement device is an Optical Channel Monitor, and wherein the determining, the obtaining, and the performing is performed in-service without external equipment.

6. The frequency offset detection method of claim 1, wherein the provisioning data and the hardware capabilities are obtained through one of a management system, a Software Defined Networking (SDN) controller, and an optical controller.

7. A controller adapted for frequency offset detection in an optical spectrum measurement device, the controller comprising:
a processor; and
memory storing instructions that, when executed, cause the processor to
determine a reference optical spectrum based on expected channels and their associated spectral occupancy without extracting any information from actual received optical spectrum,
obtain a measured optical spectrum from the optical spectrum measurement device, and
perform a frequency offset control loop using the reference optical spectrum and the measured optical spectrum to correct frequency offset in the optical spectrum measurement device;
wherein the reference optical spectrum is determined based on provisioning data which provides the expected channels and their center frequency and hardware capabilities which provide the associated spectral occupancy of the expected channels.

8. The controller of claim 7, wherein, for the frequency offset control loop, the memory storing instructions that, when executed, further cause the processor to
perform a cross-correlation between the reference optical spectrum and the measured optical spectrum,
acquire a frequency offset based on a difference between a frequency of a center of mass of cross-correlated curve and a center frequency of the reference optical spectrum, and
adjust the optical spectrum measurement device based on the frequency offset.

9. The controller of claim 7, wherein the memory storing instructions that, when executed, further cause the processor to
perform a frequency tilt control loop using the measured optical spectrum with the frequency offset corrected and the reference optical spectrum, based on grouping across the optical spectrum to correct frequency offset across or at any point in the optical spectrum.

10. The controller of claim 7, wherein the optical spectrum measurement device is an Optical Channel Monitor, and the measured optical spectrum comprises optical channels partially overlapping one another in Nyquist or in super-Nyquist spacing.

11. The controller of claim 7, wherein the optical spectrum measurement device is an Optical Channel Monitor, and wherein the determining, the obtaining, and the performing is performed in-service without external equipment.

12. The controller of claim 7, wherein the provisioning data and the hardware capabilities are obtained through one of a management system, a Software Defined Networking (SDN) controller, and an optical controller.

13. The controller of claim 7, wherein the optical spectrum measurement device is an Optical Channel Monitor, and wherein the determining, the obtaining, and the performing is performed in-service without external equipment.

14. An apparatus adapted for frequency offset detection in an optical spectrum measurement device, the apparatus comprising:
circuitry adapted to determine a reference optical spectrum based on expected channels and their associated spectral occupancy without extracting any information from actual received optical spectrum;
circuitry adapted to obtain a measured optical spectrum from the optical spectrum measurement device; and
circuitry adapted to perform a frequency offset control loop using the reference optical spectrum and the measured optical spectrum to correct frequency offset in the optical spectrum measurement device;
wherein the reference optical spectrum is determined based on provisioning data which provides the expected channels and their center frequency and hardware capabilities which provide the associated spectral occupancy of the expected channels.

15. The apparatus of claim 14, wherein, for the frequency offset control loop, the apparatus further comprises:
circuitry adapted to perform a cross-correlation between the reference optical spectrum and the measured optical spectrum,
circuitry adapted to acquire a frequency offset based on a difference between a frequency of a center of mass of cross-correlated curve and a center frequency of the reference optical spectrum, and
circuitry adapted to adjust the optical spectrum measurement device based on the frequency offset.

16. The apparatus of claim 14, further comprising:
circuitry adapted to perform a frequency tilt control loop using the measured optical spectrum with the frequency offset corrected and the reference optical spectrum, based on grouping across the optical spectrum to correct frequency offset across or at any point in the optical spectrum.

17. The apparatus of claim 14, wherein the optical spectrum measurement device is an Optical Channel Monitor and the measured optical spectrum comprises optical channels partially overlapping one another in Nyquist or in super-Nyquist spacing.

18. The apparatus of claim 14,
wherein the provisioning data and the hardware capabilities are obtained through one of a management system, a Software Defined Networking (SDN) controller, and an optical controller.

* * * * *